United States Patent
Konta

(10) Patent No.: US 9,144,848 B2
(45) Date of Patent: Sep. 29, 2015

(54) CUTTING EDGE EXCHANGE TYPE CUTTING TOOL

(71) Applicant: TUNGALOY CORPORATION, Iwaki-shi, Fukushima (JP)

(72) Inventor: Shizue Konta, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 247 days.

(21) Appl. No.: 13/757,687

(22) Filed: Feb. 1, 2013

(65) Prior Publication Data

US 2013/0142580 A1    Jun. 6, 2013

Related U.S. Application Data

(63) Continuation-in-part of application No. PCT/JP2011/072626, filed on Sep. 30, 2011.

(30) Foreign Application Priority Data

Sep. 30, 2010   (JP) .................. 2010-221295

(51) Int. Cl.
*B23C 5/20*   (2006.01)
*B23C 5/10*   (2006.01)
*B23C 5/22*   (2006.01)

(52) U.S. Cl.
CPC .............. *B23C 5/109* (2013.01); *B23C 5/2221* (2013.01); *B23C 2200/128* (2013.01); *B23C 2210/168* (2013.01); *Y10T 407/2268* (2015.01)

(58) Field of Classification Search
USPC .............................. 407/113, 42, 100–104, 48
See application file for complete search history.

(56) References Cited

U.S. PATENT DOCUMENTS

| 3,142,110 A | * | 7/1964 | Hertel | 407/114 |
| 3,490,117 A | * | 1/1970 | Hertel | 407/104 |
| 3,541,655 A | * | 11/1970 | Stier | 407/113 |
| 3,694,876 A | * | 10/1972 | Erkfritz | 407/48 |
| 3,762,005 A | * | 10/1973 | Erkfritz | 407/113 |

(Continued)

FOREIGN PATENT DOCUMENTS

| CN | 1756613 A | 4/2006 |
| JP | 4-067919 U | 6/1992 |

(Continued)

OTHER PUBLICATIONS

Official Action dated Jul. 16, 2014 issued in Chinese counterpart application (No. 201180046976.7) with English translation.

(Continued)

*Primary Examiner* — Sunil K Singh
*Assistant Examiner* — Sara Addisu
(74) *Attorney, Agent, or Firm* — Womble Carlyle

(57) ABSTRACT

A cutting edge exchange type cutting tool includes a cutting insert and a body having a chip seat to which the cutting insert is attached. The cutting insert has a first inclined surface part and a second inclined surface part. In the first wall surface, a first abutting part which abuts on the first inclined surface part is formed. In the second wall surface, a second abutting part which abuts on the second inclined surface part is formed. The first and second inclined surface parts are formed with flat surfaces. The first inclined surface part is inclined at an obtuse angle to the bottom surface. The second inclined surface part is inclined at an acute angle to the bottom surface.

15 Claims, 10 Drawing Sheets

(56) References Cited

U.S. PATENT DOCUMENTS

| | | | | |
|---|---|---|---|---|
| 3,940,835 A * | 3/1976 | Friedline et al. | | 407/49 |
| 3,955,259 A * | 5/1976 | Gustafsson | | 407/37 |
| 4,425,063 A * | 1/1984 | Striegl | | 408/81 |
| 4,531,863 A * | 7/1985 | Smith | | 407/113 |
| 4,531,864 A * | 7/1985 | Bylund | | 407/114 |
| 4,569,619 A * | 2/1986 | Newton | | 407/15 |
| 4,573,831 A * | 3/1986 | Lacey | | 407/42 |
| 4,616,962 A * | 10/1986 | Ushijima et al. | | 407/113 |
| 4,729,697 A * | 3/1988 | Lacey | | 407/42 |
| 4,934,880 A * | 6/1990 | Stashko | | 407/113 |
| 5,244,318 A * | 9/1993 | Arai et al. | | 407/42 |
| 5,346,336 A * | 9/1994 | Rescigno | | 407/104 |
| 5,421,679 A * | 6/1995 | Pantzar et al. | | 407/113 |
| 5,443,334 A * | 8/1995 | Pantzar | | 407/113 |
| 5,762,453 A * | 6/1998 | Arai et al. | | 407/113 |
| 6,146,065 A * | 11/2000 | Isaksson | | 407/114 |
| 6,164,878 A * | 12/2000 | Satran et al. | | 407/113 |
| 6,213,691 B1 * | 4/2001 | Leeb | | 407/34 |
| 6,974,280 B2 * | 12/2005 | Satran et al. | | 407/42 |
| 7,037,051 B2 * | 5/2006 | Wermeister | | 407/113 |
| 7,217,070 B2 * | 5/2007 | Hecht | | 408/154 |
| 7,390,149 B2 * | 6/2008 | Wihlborg | | 407/35 |
| 7,677,845 B2 * | 3/2010 | Limell et al. | | 408/223 |
| 7,713,006 B2 * | 5/2010 | MacLennan et al. | | 407/113 |
| 8,277,151 B2 * | 10/2012 | Wandeback | | 407/42 |
| 8,454,278 B2 * | 6/2013 | Hartlohner et al. | | 407/113 |
| 8,491,234 B2 * | 7/2013 | Fang et al. | | 407/113 |
| 8,882,405 B2 * | 11/2014 | Oprasic et al. | | 407/42 |
| 2004/0013478 A1 * | 1/2004 | Dehn et al. | | 407/113 |
| 2004/0131431 A1 * | 7/2004 | Satran | | 407/40 |
| 2005/0249559 A1 * | 11/2005 | Lof et al. | | 407/113 |
| 2006/0210364 A1 | 9/2006 | Bellmann et al. | | |
| 2006/0269366 A1 * | 11/2006 | Rieth | | 407/113 |
| 2007/0003384 A1 | 1/2007 | Smilovici et al. | | |
| 2008/0044241 A1 * | 2/2008 | Koskinen | | 407/103 |
| 2010/0054873 A1 * | 3/2010 | Men et al. | | 407/42 |
| 2010/0111620 A1 * | 5/2010 | Ishida | | 407/40 |
| 2010/0119313 A1 * | 5/2010 | Hartlohner et al. | | 407/103 |
| 2011/0305535 A1 * | 12/2011 | Jansson | | 407/103 |
| 2012/0070242 A1 * | 3/2012 | Choi et al. | | 407/113 |
| 2012/0282047 A1 * | 11/2012 | Choi et al. | | 407/103 |
| 2013/0156515 A1 * | 6/2013 | Satran et al. | | 407/48 |
| 2013/0202371 A1 * | 8/2013 | Chen | | 407/107 |
| 2013/0336732 A1 * | 12/2013 | Jansson | | 407/47 |
| 2014/0161545 A1 * | 6/2014 | Inagaki et al. | | 407/42 |
| 2014/0294525 A1 * | 10/2014 | Hecht | | 407/103 |
| 2014/0298967 A1 * | 10/2014 | Ishi | | 83/13 |

FOREIGN PATENT DOCUMENTS

| | | |
|---|---|---|
| JP | 2006-231424 A | 9/2006 |
| JP | 2008-229744 A | 10/2008 |
| JP | 2010-089250 A | 4/2010 |

OTHER PUBLICATIONS

International Preliminary Report on Patentability (IPRP) dated Apr. 2, 2013 issued in PCT counterpart application (No. PCT/JP2011/072626) with translation.

International Search Report dated Nov. 1, 2011 issued in PCT counterpart application (No. PCT/JP2011/072626).

Office Action dated May 15, 2015 issued in Chinese counterpart applicatin (No. 201180046976.7) with English translation.

* cited by examiner

CUTTING EDGE EXCHANGE TYPE CUTTING TOOL

CROSS-REFERENCE TO RELATED APPLICATIONS

This application is a Continuation-in-part of PCT application No. PCT/JP2011/072626 filed Sep. 30, 2011, which published as WO 2012/043822A1 and claims the benefit of Japanese Patent Application No. 2010-221295, filed Sep. 30, 2010. The contents of the aforementioned applications are incorporated by reference herein in their entirety.

BACKGROUND OF THE INVENTION

1. Field of the Invention

The present invention relates to a cutting edge exchange type cutting tool, and more specifically, to a structure for attaching a cutting insert to a chip seat.

2. Description of the Related Art

Usually, in a cutting edge exchange type cutting tool, as a method for fixing (clamping) a cutting insert to a chip seat of a body, are ordinarily used a method using a fastening tool such as a screw, a method using a wedge, a method using both the screw and the wedge or the like.

Japanese Patent Laid-Open No. 2006-231424 discloses a clamp method. In Japanese Patent Laid-Open No. 2006-231424, as a contrivance for improving a clamp force, a recessed part is formed in a side surface of a cutting insert which is inclined at an acute angle to a bottom surface of a chip seat, and a protruding part engaged with the recessed part is formed on a wall surface of the chip seat. By forming the inclined recessed part, a turning moment caused by the clamp force acting on the cutting insert can be effectively received by the protruding part. Thus, a stability of the cutting insert seated on the chip seat can be improved.

SUMMARY OF THE INVENTION

In the case of the invention disclosed in Japanese Patent Laid-Open No. 2006-231424, a prescribed effect is exhibited to suppress a variation of the position of the cutting edge of the cutting insert relative to a main component of force of cutting resistance, however, the variation of the position of the cutting edge caused by a turning moment in a transverse direction is not sufficiently suppressed. That is, in the invention disclosed in Japanese Patent Laid-Open No. 2006-231424, the variation of the position of the cutting edge of the cutting insert during a cutting work is still large, so that a quality with a sufficient dimensional accuracy or surface roughness of a worked surface cannot be obtained.

The present invention is developed for the purpose of solving the above-described problems. That is, it is an object of the present invention to provide a cutting edge exchange type cutting tool which helps suppress a variation of the position of a cutting edge due to turning moments of a plurality of different directions acting on a cutting insert by a fastening force of a screw or a force of a cutting resistance during cutting.

The present invention provides a cutting edge exchange type cutting tool including a cutting insert (30) having a plate shape including upper and lower surfaces (31, 32) with polygonal external shapes, a plurality of side surfaces (34) extending between the upper and lower surfaces and a cutting edge (5) defined by intersecting parts of a cutting surface formed in the upper surface (31) and relief surfaces formed in the plurality of side surfaces, and a body (20) including a chip seat (21) to which the cutting insert (30) is attached, wherein the chip seat (21) includes a bottom surface (26) that supports the lower surface (32) of the cutting insert (30) and first and second wall surfaces (22, 24) respectively intersecting the bottom surface (26), arranged in directions so as to intersect each other and respectively opposed to the two side surfaces of the plurality of side surfaces (34) of the cutting insert (30), the cutting insert (30) includes a first inclined surface part (35) formed in one of the two side surfaces and a second inclined surface part (36) formed in the other of the two side surfaces, in the first wall surface (22), a first abutting part (23), which abuts on the first inclined surface part (35), is formed in the second wall surface (24), a second abutting part (25), which abuts on the second inclined surface part (36), is formed the first and second inclined surface parts (35, 36) are formed with flat surfaces, the first inclined surface part (35) is inclined at an obtuse angle to the bottom surface (26), and the second inclined surface part (36) is inclined at an acute angle to the bottom surface (26).

According to the present invention, since the plurality of inclined surfaces which are inclined in mutually different directions are formed in the side surfaces of the cutting insert and the protruding parts respectively abutting on the inclined surfaces are formed in the corresponding wall surfaces of the chip seat, the turning moments of the plurality of different directions which act on the cutting insert can be effectively received. As a result, the variation of the position of the cutting edge of the cutting insert can be suppressed.

Further features of the present invention will become apparent from the following description of exemplary embodiments (with reference to the attached drawings).

DETAILED DESCRIPTION

First Exemplary Embodiment

Figure 1:
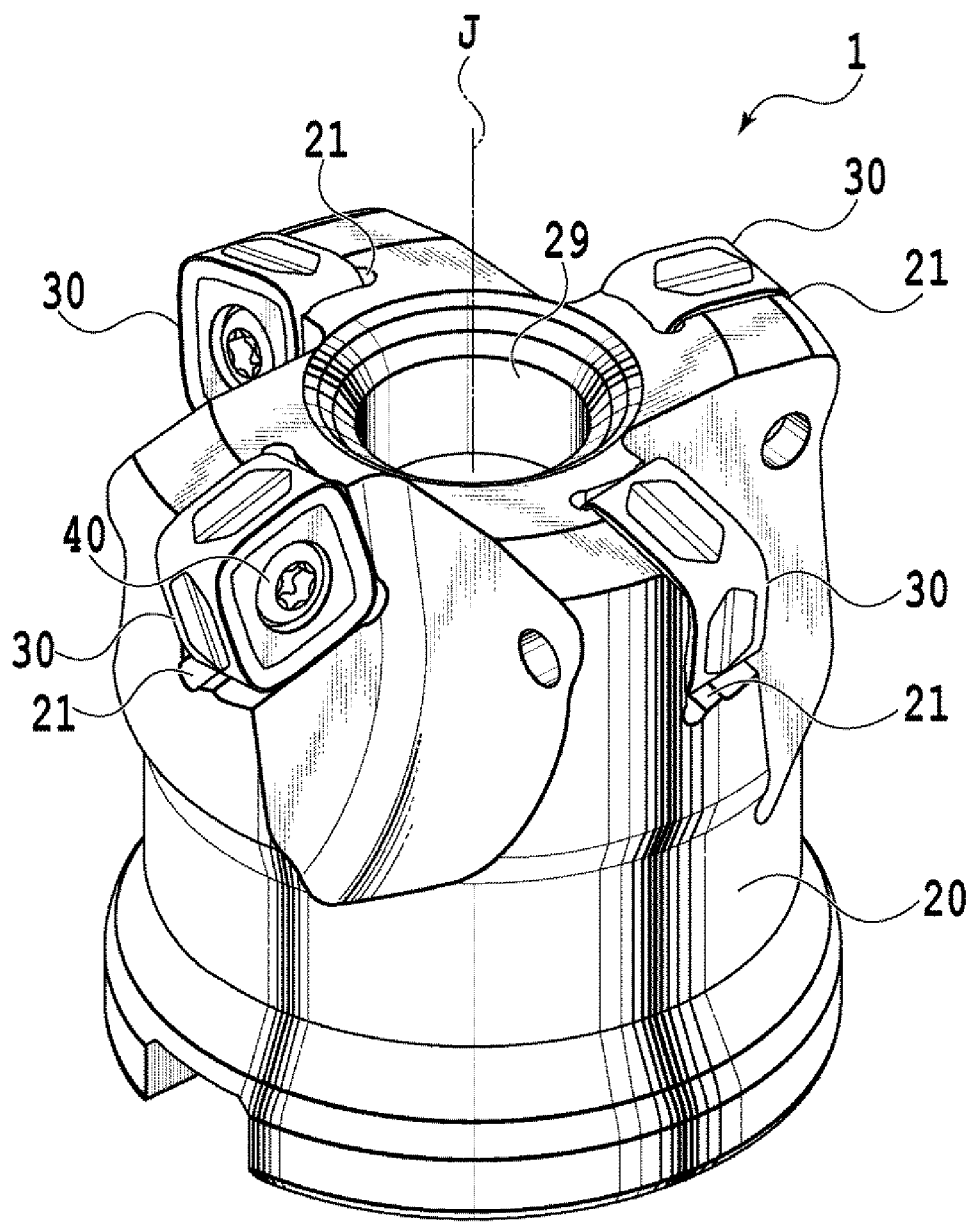
FIG. 1 A perspective view showing one exemplary embodiment of a cutting edge exchange type cutting tool of the present invention.

The cutting edge exchange type cutting tool 1 (hereinafter referred to as a "cutter 1") of the present exemplary embodiment includes, as shown in FIG. 1, a body 20, a cutting insert 30 and a screw 40 as a fixing member that fixes the cutting insert 30 to the body 20. Incidentally, the body in the below-described explanation is defined in accordance with a definition in JIS. A leading end part of the body 20 defines a chip seat 21 on which the cutting insert 30 is mounted. The chip seat 21 is formed by cutting out a part of the leading end of the body 20 in a form corresponding to the external shape of the cutting insert 30. In a central part of the body 20, a through hole 29 is formed. An arbor is inserted and fixed to the through hole 29. The body 20 is attached to a spindle of a machine tool through the arbor. Incidentally, the cutter 1 rotates on a rotation axis J thereof to carry out a cutting work.

Figure 2:
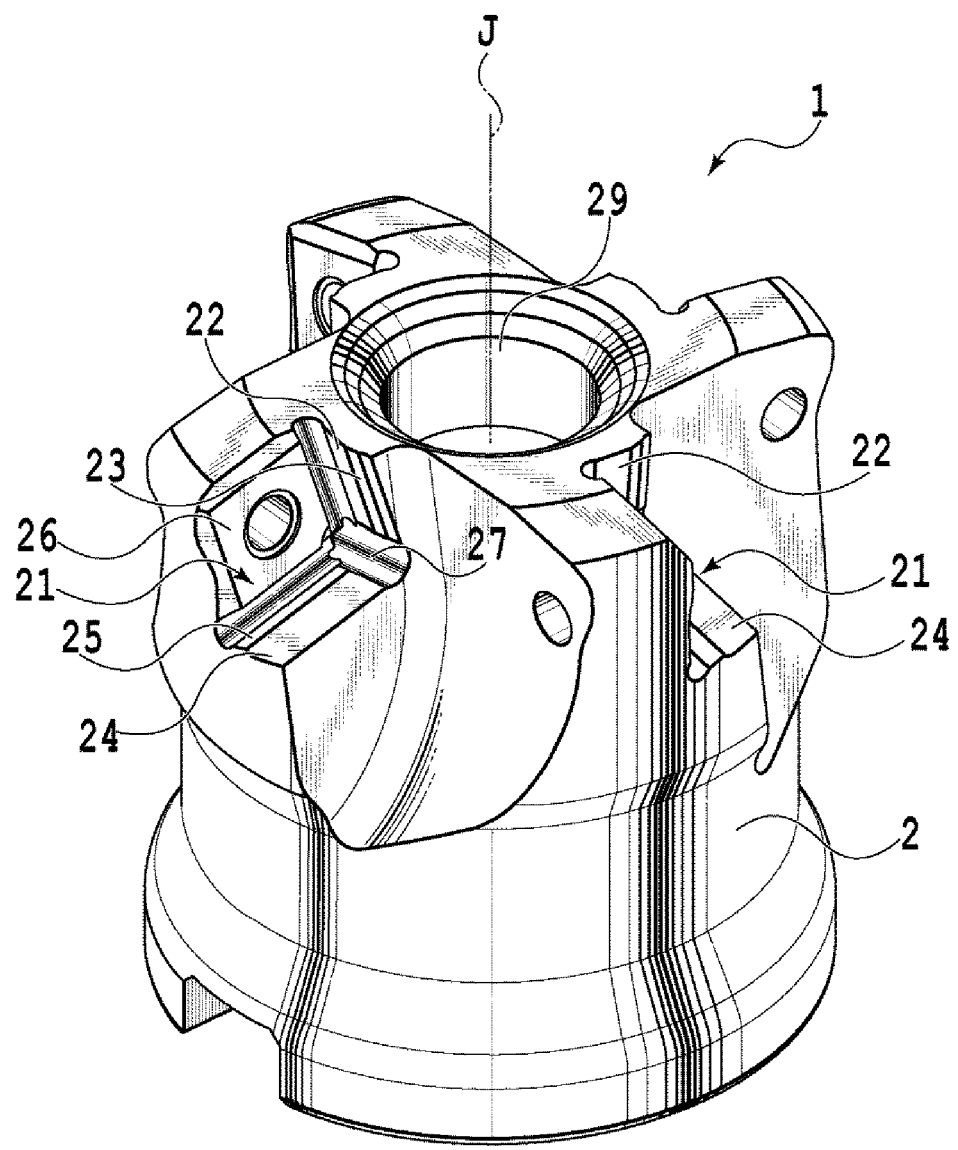
FIG. 2 A perspective view showing a body of FIG. 1.
Figure 3:
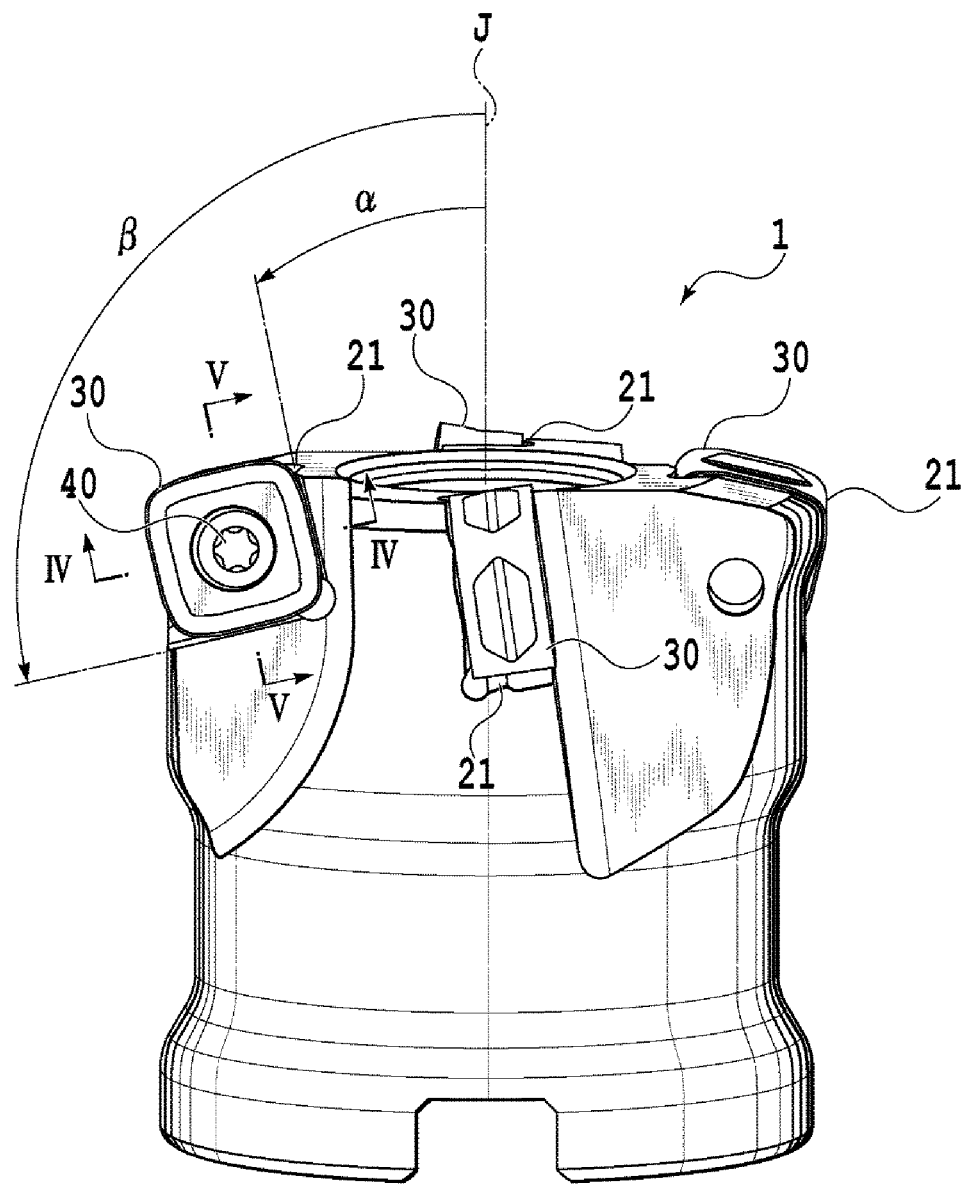
FIG. 3 A front view of the body in FIG. 2.

As shown in FIG. 2 and FIG. 3, in a periphery of a bottom surface 26, which has a square shaped external shape, of the chip seat 21, a first wall surface 22 and a second wall surface 24 are formed. The first wall surface 22 extends from a base end side to a leading end side of the body 20. The second wall surface 24 extends from the rotation axis J side to an outer peripheral side. The first wall surface 22 is connected to the second wall surface 24 through a corner cutting part 27. The bottom surface 26 is directed to a rotating direction of the cutter 1 centering on the rotation axis J. Further, the first wall surface 22 prescribes the position and direction of a side surface of four side surfaces of the cutting insert which is arranged in an outer peripheral side of the body 20 relative to the body 20. The second wall surface 24 serves to prescribe the position and direction of a side surface of the four side surfaces of the cutting insert which is arranged in the leading end side of the body 20 relative to the body 20.

Here, the definition of the first wall surface 22 and the second wall surface 24 will be described. Initially, assuming a plane (a longitudinally sectional surface of the cutter 1) including the rotation axis J and passing any position of the cutting insert (for example, an intermediate part of upper and lower surfaces). In this plane, as shown in FIG. 3, a wall surface that has a relatively smaller angle α of two angles formed by the wall surfaces 22 and 24 and the rotation axis J is set to the first wall surface 22. A wall surface that has a relatively larger angle β is set to the second wall surface 24. Incidentally, in the present exemplary embodiment, the two wall surfaces are perpendicular to the bottom surface 26 of the chip seat 21. However, in other exemplary embodiment, the wall surface may be inclined to the wall surface 26, or the wall surface may be a curved surface. Even when the wall surface is inclined, the angle formed by the wall surface and the rotation axis J is exclusively determined in the plane including the rotation axis J and passing the cutting insert 30. When the wall surface is curved, the angle formed by the wall surface and the rotation axis J may not be exclusively determined in the plane including the rotation axis J and passing the cutting insert 30, however, the smallest angle of angles formed by tangential lines passing the curved wall surface and the rotation axis J may be set to α and β. Further, when a qualitative explanation is added to the definition of the first wall surface 22 and the second wall surface 24, a wall surface located in advance of a direction, to which a feed component of force of a cutting resistance is applied, is set to the first wall surface 22. A wall surface located in advance of a direction, to which a back component of the force of the cutting resistance is applied, is set to the second wall surface 24.

Figure 4:
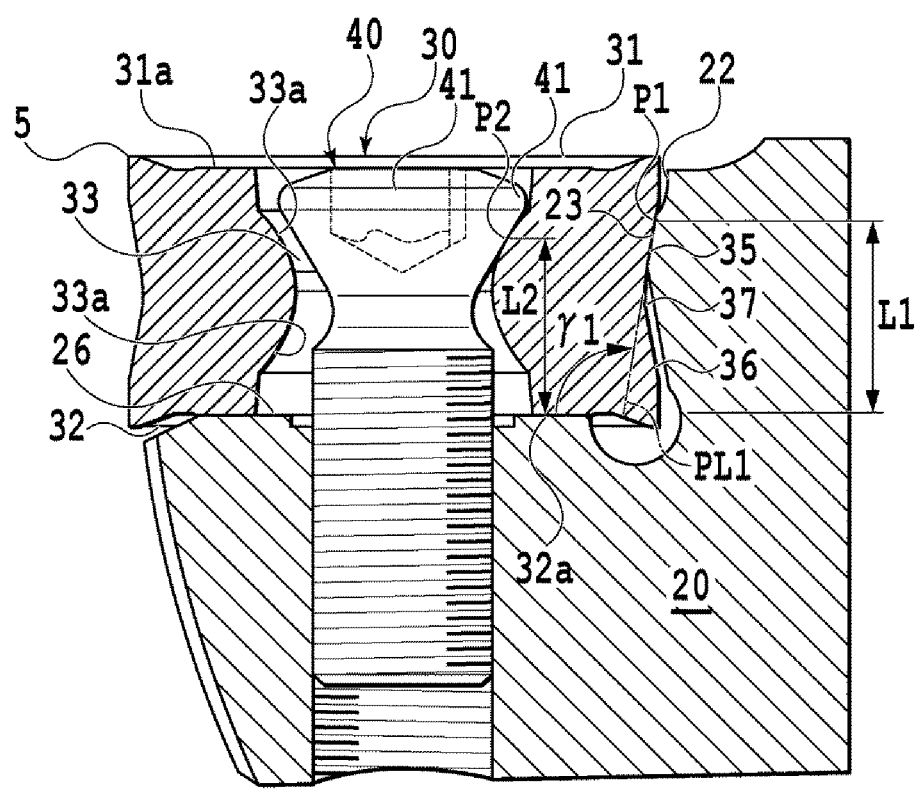
FIG. 4 A sectional view of the body taken along a line IV-IV in FIG. 3.

In the first wall surface 22, as shown in FIG. 2 and FIG. 4, a first abutting part 23 protruding from the first wall surface 22 is formed from one end part of the first wall surface 22 to the corner cutting part 27 in parallel with the bottom surface 26 of the chip seat. Further, the first abutting part 23 is located nearer to an upper surface 31 between the upper surface 31 and a lower surface 32 of the cutting insert 30. The first abutting part 23 is formed nearer to the upper surface 31 side with respect to an imaginary plane (not shown in the drawing) midway between the upper surface 31 and the lower surface 32 and parallel thereto. Incidentally, as described below, the first abutting part 23 abuts on one of first inclined surface parts 35 defined by recessed parts 37 respectively formed in the four side surfaces 34 of the cutting insert 3. In the present exemplary embodiment, the first abutting part 23 is inclined at the same angle as that of the first inclined surface part 35, and the first abutting part 23 is formed so as to come into surface contact with the first inclined surface part 35.

Figure 5:
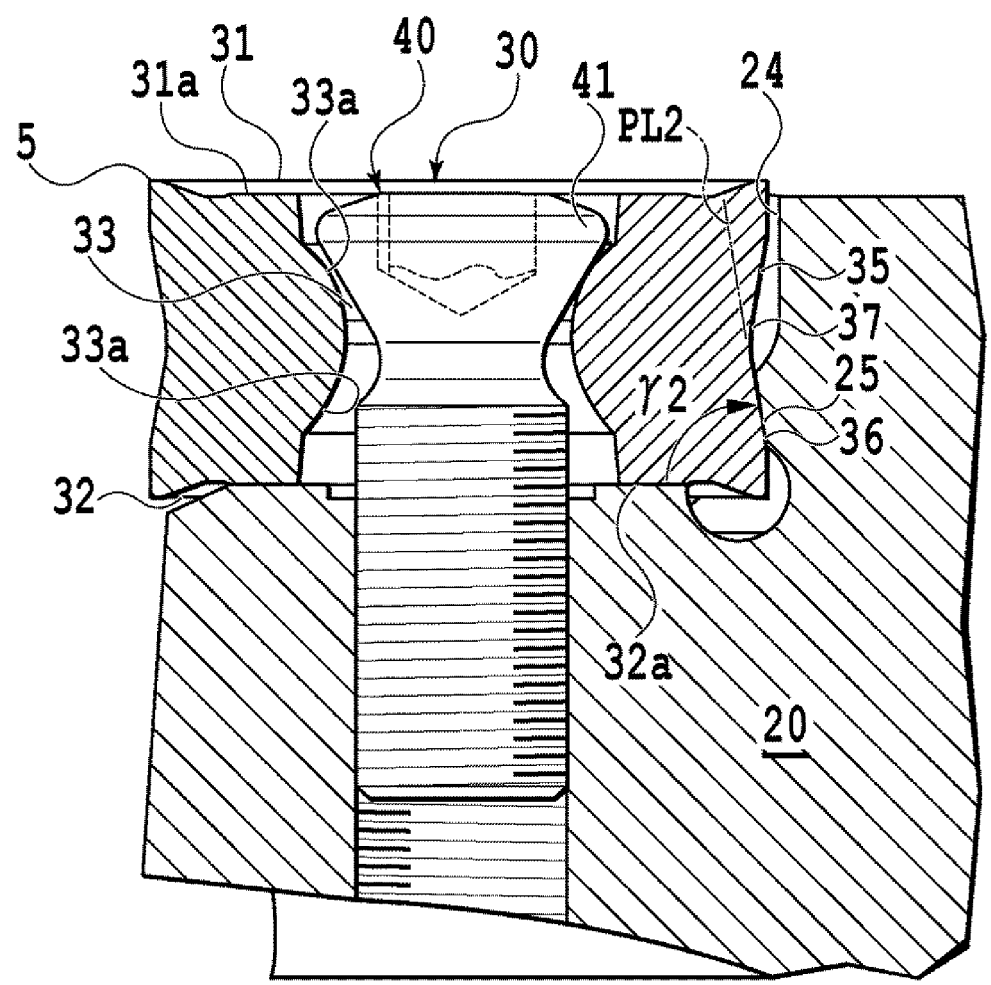
FIG. 5 A sectional view of the body taken along a line V-V in FIG. 3.

In the second wall surface 24, as shown in FIG. 2 and FIG. 5, a second abutting part 25 protruding from the second wall surface 24 is formed from one end part to the corner cutting part 27 in parallel with the bottom surface 26 of the chip seat. Further, as seen in FIG. 5, the second abutting part 25 abuts the cutting insert 3 at a location nearer to the insert's lower surface 32 than to the insert's upper surface 31. That is, the second abutting part 25 is formed nearer to the lower surface 32 side with respect to an imaginary plane (not shown in the drawing) midway between the upper surface 31 and the lower surface 32 and parallel thereto. Incidentally, as described below, the second abutting part 25 abuts on one of second inclined surface parts 36 defined by the recessed parts 37 respectively formed in the four side surfaces of the cutting insert 30. In the present exemplary embodiment, the second abutting part 25 is inclined at the same angle as that of the second inclined surface part 36, and the second abutting parts 25 is formed so as to come into surface contact with the second inclined surface part 36.

Figure 6:
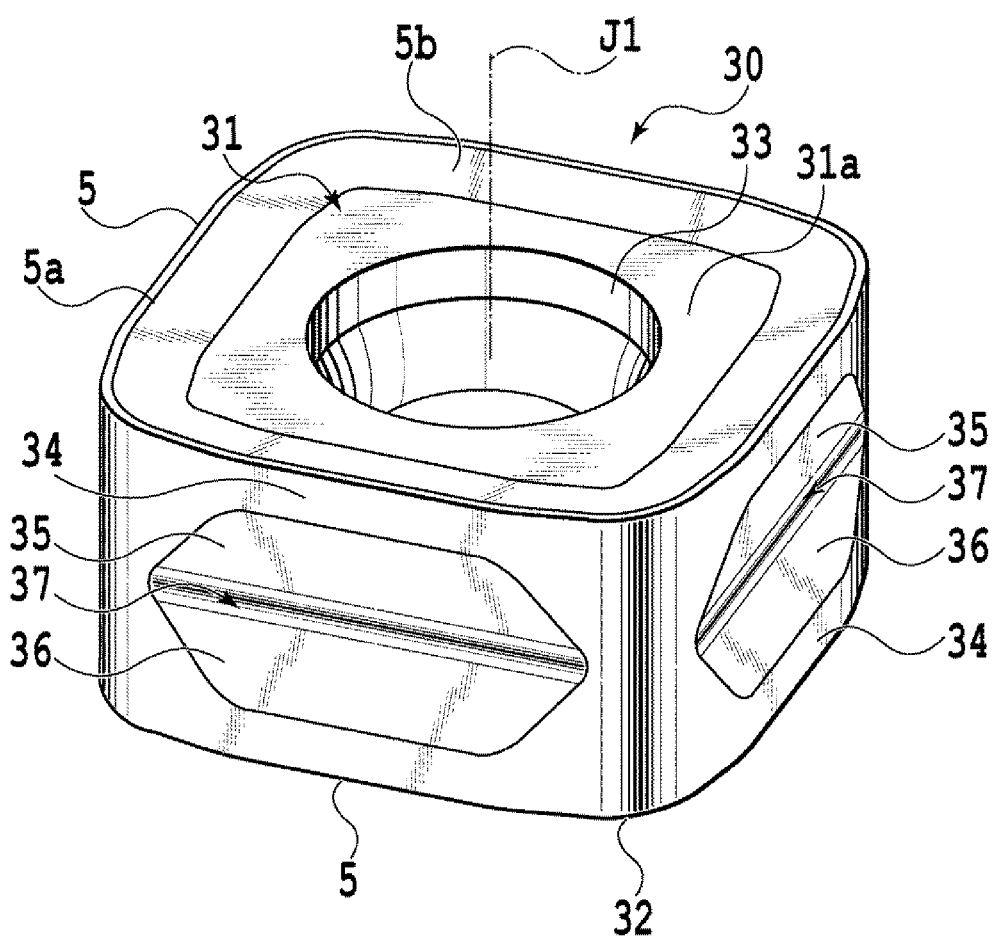
FIG. 6 A perspective view of a cutting insert forming the cutting edge exchange type cutting tool of the present exemplary embodiment.
Figure 7:
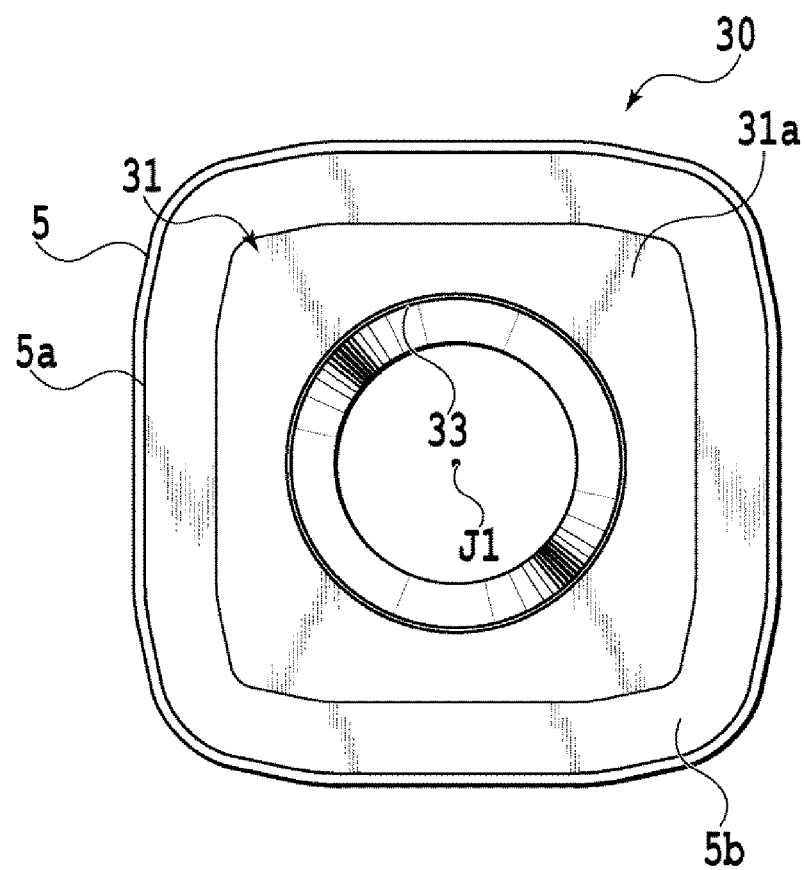
FIG. 7 A front view of the cutting insert in FIG. 6.

FIG. 6 is a perspective view of the cutting insert used in the cutting edge exchange type cutting tool of the present exemplary embodiment. FIG. 7 is a front view of the cutting insert shown in FIG. 6. As shown in these figures, the cutting insert 30 has the upper surface 31 and the lower surface 32 whose external shapes are substantially square, and the side surfaces 34 extend between the upper and lower surfaces 31 and 32, so that the cutting insert 30 has a plate-shaped body. A part of the upper surface 31 functions as a cutting face during a cutting work.

The upper surface 31 is orthogonal to the side surfaces 34. That is, the cutting insert 30 is what is called a negative type cutting insert, having a 0° relief angle formed. Since the cutting insert 30 has the above-described shape, the cutting insert has a symmetrical shape with respect to a central axis J1, that is, a vertically symmetrical shape. In an intersecting part of the upper surface 31 and the side surface 34, a cutting edge 5 is formed. On the upper surface 31, a first cutting face 5a is formed adjacently to the cutting edge 5. Then, a second cutting face 5b is formed adjacently to the first cutting face 5a. Inside the second cutting face 5b, a seated surface 31a, which is to be supported by the bottom surface 26 of the chip seat 21 when the cutting insert 30 is inverted, is formed. The second cutting face 5b is inclined toward the seated surface 31a of the cutting insert 30. The first and second cutting faces 5a and 5b are formed over an entire circumference of the upper surface 31. A fixing member attaching hole 33 is formed from the upper surface 31 of the cutting insert 30 to the lower surface 32 opposed to the upper surface 31 and vertically passes through toward the seated surface 31a supported by the bottom surface 26 of the chip seat 21. In an intersecting part of the lower surface 32 and the side surface 34, a cutting edge 5 is also formed. As shown in FIG. 4, in a central part of an inner wall of the fixing member attaching hole 33, a loaded protruding part 33a is formed. The loaded protruding part 33a protrudes toward a central axis J1 of the cutting insert 30. The loaded protruding part 33a is bent in the convex shape of a circular arc in section. When the cutting insert 30 is clamped to the chip seat 21 by the screw 40, a screw head 41 of the screw 40 abuts on the loaded protruding part 33a to press the cutting insert 30 to the bottom surface 26 of the chip seat 21. By forming the loaded protruding part 33a, a force of the screw 40 (the fixing member) for pressing the cutting insert 30 to the bottom surface 26 of the chip seat is assuredly transmitted to the cutting insert 30.

In each of the four side surfaces 34, the recessed parts 37 which define the first inclined surface parts 35 and the second inclined surface parts 36 are respectively formed. The first inclined surface part 35 is formed with a flat surface and abuts on the first abutting part 23 formed on the first wall surface 22 of the chip seat 21. The second inclined surface part 36 is formed with a flat surface and abuts on the second abutting part 25 formed on the second wall surface 24 of the chip seat 21. The recessed parts 37 (the first inclined surface parts 35 and the second inclined surface part 36) are respectively extended along circumferential directions of the side surfaces 34. The recessed parts 37 are separated from the upper surface 31 and the lower surface 32 and are located in central areas between the upper surface 31 and the lower surface 32. The recessed parts 37 are seen to also be separated from insert corners on either side, though this is not an absolute requirement. The first inclined surface parts 35 are respectively inclined in different directions relative to tangential planes of the side surfaces 34 parallel to the central axis J1 of the cutting insert 30.

The first inclined surface part 35 is formed nearer to the upper surface 31 side than to a central part between the upper surface 31 and the lower surface 32. The first inclined surface part 35 is inclined from the upper surface 31 side to the lower surface 32 side so as to gradually come closer to the central axis J1. The second inclined surface part 36 is formed nearer to the lower surface 32 side than to the central part between the upper surface 31 and the lower surface 32. The second inclined surface 36 is inclined from the lower surface 32 side to the upper surface 31 side so as to gradually come closer to the central axis J1.

As shown in FIG. 4, when the cutting insert 30 is seen in a cross-section taken perpendicular to the upper surface 31, an imaginary extension PL1 of the first inclined surface part 35 intersects the bottom surface 26 of the chip seat 21 at an obtuse angle of $y1$. In other words, a tangential plane at an abutting part of the first inclined surface part 35 and the first abutting part 23 intersects the bottom surface 26 of the chip seat 21 at the obtuse angle of $y1$. Incidentally, in the present exemplary embodiment, when the imaginary extension PL1 is parallel to the bottom surface 26 of the chip seat 21, an intersecting angle of the bottom surface 26 and the imaginary extension PL1 is defined as 0°, and the intersecting angle is prescribed by rotating the bottom surface clockwise therefrom. As shown in FIG. 4, an angle formed by the bottom surface 26 of the chip seat 21 and the imaginary extension PL1 of the first inclined surface part 35 is set to a clockwise angle from the bottom surface 26 of the chip seat 21, which is an obtuse angle. In a description of the shape of the first inclined surface part 35 by using a qualitative expression, the first inclined surface part 35 is inclined relative to the bottom surface 26 so that its extended surface PL1 is gradually separated from the central axis J1 of the cutting insert 30 from the lower surface 32 to the upper surface 31 of the cutting insert 30.

As shown in FIG. 4, when the cutting insert 30 is attached to the chip seat 21, a leading end surface of the first abutting part 23 formed in the first wall surface 22 of the chip seat 21 comes into surface contact with the first inclined surface part 35 formed in the insert's side surface 34 opposed to the first wall surface 22 of the chip seat 21. In the present exemplary embodiment, an abutting position P1 of the first abutting part 23 and the first inclined surface part 35 is formed at a position more separated from the bottom surface 26 of the chip seat 21 than an abutting position P2 of the screw 40 and the cutting insert 30. That is, a distance L1 from the bottom surface 26 of the chip seat 21 to the abutting position P1 of the first abutting part 23 and the first inclined surface part 35 is formed so as to be longer than a distance L2 from the bottom surface 26 of the chip seat 21 to the abutting position P2 of the screw head of the screw 40 and the loaded protruding part 33a.

As shown in FIG. 5, when the cutting insert 30 is attached to the chip seat 21, imaginary extension PL2 of the second inclined surface part 36 formed in the side surface 34 opposed to the second wall surface 24 of the chip seat 21 intersects the bottom surface 26 of the chip seat 21 at an acute angle of $y2$ by viewing the cutting insert 30 in a cross-section taken perpendicular to the upper surface 31. That is, a tangential plane at an abutting position of the second inclined surface part 36 and the second abutting part 25 intersects the bottom surface 26 of the chip seat 21 at the acute angle of $y2$. In other words, in a description of the shape of the second inclined surface part 36 by using a qualitative expression, the second inclined surface part 36 is inclined relative to the bottom surface 26 of the chip seat 21 so that its imaginary extension PL2 gradually comes closer to the central axis J1 of the cutting insert 30 from the lower surface 32 to the upper surface 31 of the cutting insert 30.

The second inclined surface part 36 is connected to the first inclined surface part 35 through a curved surface. The imaginary extensions intersect each other at an obtuse angle. Accordingly, a sectional shape of the recessed part 37 is seen to be substantially the shape of V.

Further, in the cutter 1 of the present exemplary embodiment, the second abutting part 25 of the second wall surface 24 abuts on the second inclined surface part 36 inclined at the acute angle to the bottom surface 26 of the chip seat 21. Accordingly, when the cutting resistance (a main component of force) is applied to the cutting insert 30 as an external force, a turning moment that is liable to turn the cutting insert 30 counterclockwise is applied to the cutting insert 30 in FIG. 5. At this time, the turning moment is applied to the second abutting part 25 of the chip seat 21 through the second inclined surface part 36. Therefore, in the cutting insert 30, a reaction force acts on the second inclined surface part 36 of the cutting insert 30 from the second abutting part 25. Since the second inclined surface part 36 is inclined, the reaction force includes not only a component of force that allows the cutting insert 30 to make a translational movement along the bottom surface 26, but also a component of force that generates a turning moment so as to resist the turning moment by the external force. As a result, the turning moment by the external force which is applied to the cutting insert 30 is effectively received by the second abutting part 25 of the chip seat 21 through the second inclined surface part 36. Further, a variation of a position of the cutting edge caused by the turning moment by the external force (the main component of force) can be suppressed.

In the cutter 1 of the present exemplary embodiment, for example, the first abutting part 23 of the first wall surface 22 abuts on the first inclined surface part 35 inclined at the obtuse angle to the bottom surface 26 of the chip seat 21. Accordingly, when a feed component of force as one of components of a cutting resistance is exerted on the cutting insert 30 as an external force, a turning moment that is liable to turn the cutting insert 30 clockwise is applied to the cutting insert 30 in FIG. 4. The turning moment is applied to the first abutting part 23 of the chip seat 21 through the first inclined surface part 35. Therefore, a reaction force acts on the first inclined surface part 35 of the cutting insert 30 from the first abutting part 23. Since the first inclined surface part 35 is inclined, the reaction force includes not only a component of force that allows the cutting insert 30 to make a translational movement along the bottom surface 26, but also a component of force that generates a turning moment so as to resist the turning moment by the external force. As a result, the turning moment by the external force which is applied to the cutting insert 30 is effectively received by the first abutting part 23 of the chip seat 21 through the first inclined surface part 35. Therefore, a variation of a position of the cutting edge caused by the turning moment by the external force can be suppressed. Further, the external force that allows the turning moment to be applied to the cutting insert 30 includes a fastening force by the screw 40. When the screw head 41 is engaged with the loaded protruding part 33a of the cutting insert 30, the turning moment is applied to the cutting insert 30. This turning moment is also effectively received by the first abutting part 23 of the chip seat 21 through the first inclined surface part 35 in accordance with the same operations as described above. Consequently, a bending stress constantly applied to the screw 40 can be greatly reduced. Therefore, the variation of the position of the cutting edge caused by the bending stress can be suppressed.

The abutting position of the first abutting part 23 and the first inclined surface part 35 is formed at the position more separated from the bottom surface 26 of the chip seat 21 than the abutting position of the second abutting part 25 and the second inclined surface part 36. Thus, the turning moments respectively applied to different directions can be more effectively received than those applied when the two abutting positions are spaced by the substantially same distance from the bottom surface 26 of the chip seat or when a positional relation of the abutting position is reversed.

In the present exemplary embodiment, the recessed parts 37 having the same shapes are respectively formed in the four side surfaces 34, positions of corners of the cutting insert 30 can be easily changed. That is, since the inclined surface parts 35 and the second inclined surface parts 36 having the same shapes are formed in the four side surfaces, when the cutting insert 30 is indexed at intervals of 90°, the four corners of the cutting edge 5 can be used. Further, when the front and the back of the cutting insert 30 are reversed, the first inclined surface part 35 functions as the second inclined surface part 36. Thus, the four corners of the cutting edge 5 of the lower surface 32 side can also be used. In the present exemplary embodiment, all the intersecting parts of the upper surface 31 and the lower surface 32 and the side surfaces 34 can be used as the cutting edges. Therefore, the cutter 1 can cut more deeply than the cutting insert as disclosed in Japanese Patent Laid-Open No. 2006-231424.

Further, in the present exemplary embodiment, the abutting position P1 of the first abutting part 23 and the first inclined surface part 35 is formed, as shown in FIG. 4, so that the distance L1 from the bottom surface 26 of the chip seat 21 to the abutting position P1 is longer than the distance L2 from the bottom surface 26 to the abutting position P2 of the screw 40 and the loaded protruding part 33a. That is, since a distance from a center of gravity of the cutting insert 30 to the abutting position P1 with the first wall surface 22 is longer than a distance from a center of gravity of the cutting insert 30 to the abutting position P2 with the screw 40, the turning moment by the external force acting on the cutting insert 30 can be more effectively received in the first abutting part 23.

Second Exemplary Embodiment

Figure 8A:
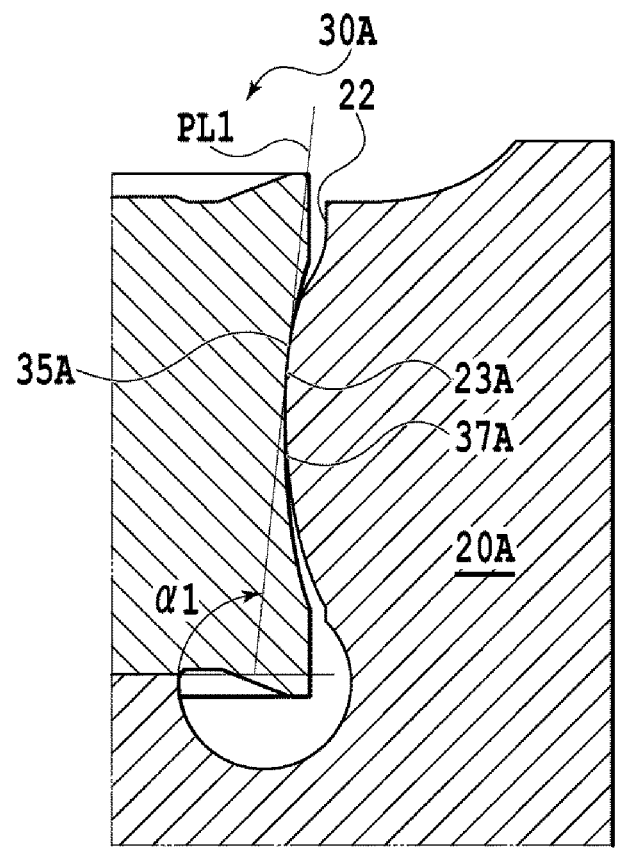
FIG. 8A A sectional view showing a structure in a vicinity of a first wall surface of a chip seat according to a second exemplary embodiment of the present invention.
Figure 8B:
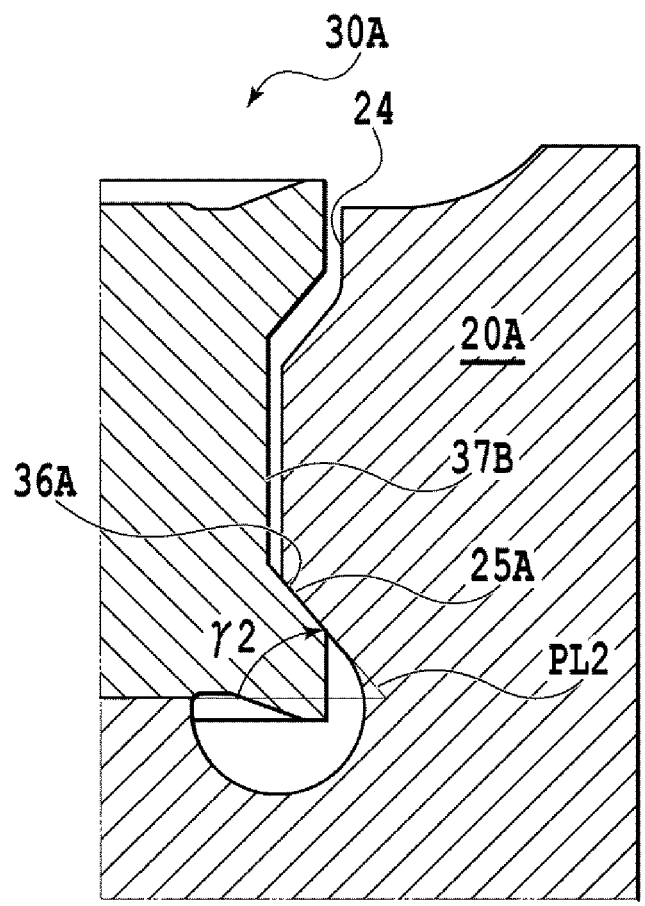
FIG. 8B A sectional view showing a structure in the vicinity of a second wall surface of the chip seat according to the second exemplary embodiment of the present invention.

Next, a second exemplary embodiment of the present invention is shown in FIGS. 8A and 8B. In FIG. 8A and FIG. 8B, the same reference numerals are used for the same components as those of the first exemplary embodiment.

FIG. 8A is a sectional view showing a structure in the vicinity of a first wall surface 22 of a chip seat in a tool according to the second exemplary embodiment. FIG. 8B is a sectional view showing a structure in the vicinity of a second wall surface 24 of the chip seat.

As shown in FIGS. 8A and 8B, in a cutting insert 30A of the present exemplary embodiment, a structure of a side surface opposed to the first wall surface 22 of the chip seat is different from a structure of a side surface opposed to the second wall surface 24. Specifically, a first inclined surface 35A is defined by a part of a first recessed part 37A formed with a curved surface curved in the shape of a circular arc. A second inclined surface 36A is defined by a flat surface forming a part of a second recessed part 37B which has a trapezoidal shape in section. A first abutting part 23A is formed with a curved surface curved in the shape of a circular arc correspondingly to the shape of the first recessed part 37A. A second abutting part 25A is formed in a trapezoidal shape correspondingly to the shape of the second recessed part 37B. Since the shapes of the two recessed parts 37A and 37B are made to be different from each other as described above, a stability of attachment of the cutting insert 30 can be more improved than that when the two recessed parts have the same shapes.

Incidentally, in FIGS. 8A and 8B, the sectional shape of the first recessed part 37A is the curved shape, and the sectional shape of the second recessed part 37B is the trapezoidal shape. Conversely, the sectional shape of the first recessed part 37A may be trapezoidal shape, and the sectional shape of the second recessed part 37B may be curved shape.

The cutting edge exchange type cutting tool of the present invention is not limited to the above described exemplary embodiments and may be freely changed without departing from a scope of its technical idea.

For example, in the first exemplary embodiment, an example is described in which the first inclined surface part and the second inclined surface part are formed in each of the side surfaces of the cutting insert. However, a cutting insert may be used in which only a first inclined surface part is formed in one side surface of the cutting insert and only a second inclined surface part is formed in the other side surface adjacent to the first side surface. Further, both a first inclined surface part and a second inclined surface part may be formed with circular arc shaped curved surfaces.

In the above-described exemplary embodiment, the attaching hole of the fixing member is the through hole. However, the attaching hole may be a blind hole. When the attaching hole of the fixing member is the blind hole, the cutting insert may be fixed by a fixing method in which a protrusion of the cutting insert is engaged with the fixing member attaching hole and the cutting insert is drawn to the wall surface of the chip seat like a fixing method by a wedge.

As described in the second exemplary embodiment, the sectional shapes of the first recessed part and the second recessed part are made to be different from each other. However, even when the first recessed part and the second recessed part have shapes other than the shapes of V and the same shapes, the same stability in seating as that of the first exemplary embodiment can be obtained.

Figure 9:
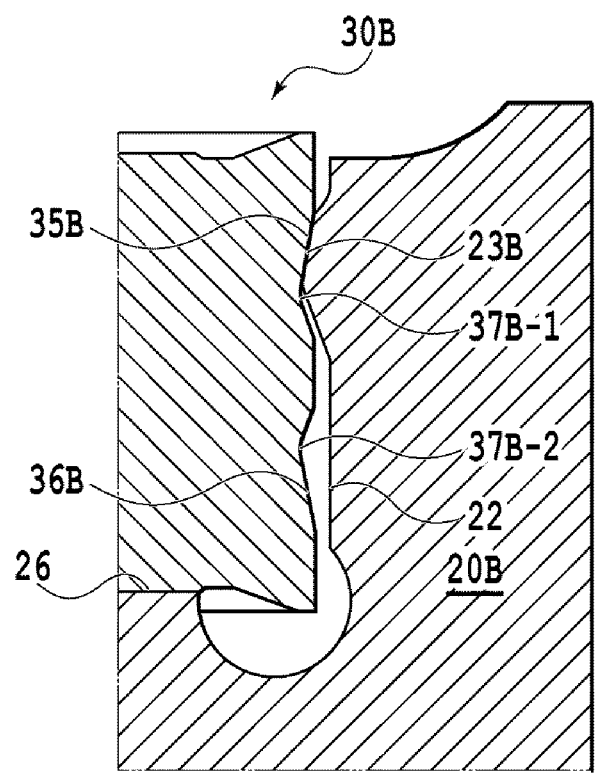
FIG. 9 A schematic view showing another exemplary embodiment of the cutting insert.

Further, as shown in FIG. 9, when a first recessed part 37B-1 that defines a first inclined surface part 35B in one side surface of a cutting insert 30B and a second recessed part 37B-2 that defines a second inclined surface part 36B in the same side surface are separately formed, corners can be changed. The second recessed part 37B-2 is formed at a position nearer to a seated surface 26 than the recessed first part 37B-1. It is to be understood that a structure having the above-described two recessed parts may be applied to other side surfaces of the cutting insert 30B.

As for the shape of the cutting face, in the above-described exemplary embodiment, the cutting face has the square shape. However, the present invention is not limited thereto, and a triangular shape, a pentagonal shape or other polygonal shapes may be used. As for a rotating direction of the tool, in the above-described exemplary embodiment, the tool is formed so as to be rotated clockwise. However, even when the tool is formed so as to be rotated counterclockwise, the effects of the present invention are still realized. As for the number of blades of the tool, in the above-described exemplary embodiment, two blades are used. However, one blade may be used. Even when three or more blades are used, the effects of the present invention are still realized.

In the above-described exemplary embodiment, the recessed part is formed which defines the inclined surface parts in the cutting insert. The abutting parts are formed which protrude from the first and second wall surfaces in the chip seat. However, for example, a protruding part may be formed which defines the first and second inclined surface parts in the cutting insert, and a recessed part may be formed which defines the first and second abutting parts in the first and second wall surfaces of the chip seat.

In the above-described exemplary embodiment, the first inclined surface part comes into surface contact with the first abutting part, and the second inclined surface part comes into surface contact with the second abutting part. However, in either or both the cases, the surface contact may be changed to a linear contact. It is important in the present invention that when the cutting insert is seen from cross-sections passing through the abutting positions of the inclined surface parts and the abutting parts and perpendicular to the upper surface and the cutting edge, there is at least one position of the state as shown in FIG. 4 or FIG. 5. That is, in the case of the first inclined surface part and the first abutting part, in either of the sections of the two abutting positions, when the imaginary extension of the first inclined surface part intersects the lower surface of the cutting insert or the bottom surface of the chip seat at the obtuse angle, the effects aimed at by the present invention can be achieved. Accordingly, for example, when the first inclined surface part and the first abutting part are bent and come into linear contact with each other, in either of the cross-sections passing through the abutting positions, the imaginary extension of the first inclined surface part may intersect the lower surface of the cutting insert or the bottom surface of the chip seat at the obtuse angle. Further, when the tangential plane in any of positions of the abutting positions intersects the lower surface of the cutting insert or the bottom surface of the chip seat at the obtuse angle, the effects of the present invention can be obtained.

In the case of the second inclined surface part and the second abutting part, similarly to the above-described matter, in either of the sections of the two abutting positions, when the imaginary extension of the second inclined surface part intersects the lower surface of the cutting insert or the bottom surface of the chip seat at the acute angle, the effects aimed at by the present invention can be achieved.

As described above, the representative exemplary embodiments of the present invention are explained. However, the exemplary embodiments may be variously modified, and replaced and changed without departing the spirit and scope of the present invention defined by claims of the present invention. Further, all modifications or changes belonging to scopes equivalent to the claims are to be included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A cutting edge exchange type rotating cutting tool comprising:
   a tool body having a rotation axis, a rotating direction centered on the rotation axis and a chip seat, the chip seat comprising:
      a bottom surface facing the rotating direction;
      first and second wall surfaces intersecting the bottom surface and arranged in directions so as to intersect each other;
      a first abutting part formed in the first wall surface;
      a second abutting part in the second wall surface; and
   a cutting insert attached to the chip seat, the cutting insert having a plate shape and comprising:
      upper and lower surfaces with polygonal external shapes;
      at least first and second side surfaces extending between the upper and lower surfaces;
      a cutting edge defined by intersecting parts of a cutting surface formed in the upper surface and relief surfaces formed in the plurality of side surfaces;
      a first inclined surface part formed in the first side surface; and
      a second inclined surface part formed in the second side surface;
   wherein:
      the bottom surface of the chip seat supports the lower surface of the cutting insert;
      the first abutting part abuts the first inclined surface part;
      the second abutting part abuts the second inclined surface part;
      the first and second inclined surface parts are formed with flat surfaces;
      the first inclined surface part is inclined at an obtuse angle to at least one of the bottom surface and the lower surface; and
      the second inclined surface part is inclined at an acute angle to at least one of the bottom surface and the lower surface.

2. The cutting edge exchange type rotating cutting tool according to claim 1, wherein
   the cutting insert has a substantially square external shape,
   the bottom surface of the chip seat faces a rotating direction centering on a rotation axis of the cutting edge exchange type cutting tool,
   the first abutting part prescribes a position and direction of an insert side surface which is arranged in an outer peripheral side of the tool body, and
   the second abutting part prescribes a position and direction of an insert side surface which is arranged in a leading end side of the tool body.

3. The cutting edge exchange type rotating cutting tool according to claim 1, wherein the cutting insert has a substantially square external shape; and the first wall surface forms a first angle with the rotation axis which is smaller than a second angle formed between the second wall surface and the rotation axis.

4. The cutting edge exchange type rotating cutting tool according to claim 1, wherein the tool further comprises a fixing member for fixing the cutting insert to the chip seat, the upper surface of the cutting insert comprises a fixing member attaching hole or a recessed part, into which the fixing member is inserted, the fixing member abuts an inner wall of the fixing member attaching hole or recessed part, and the entirety of a first abutting position where the first abutting part abuts the first inclined surface part is further from the bottom surface of the chip seat than a second abutting position where the fixing member abuts the fixing member attaching hole or recessed part.

5. The cutting edge exchange type rotating cutting tool according to claim 1, wherein:

the first abutting part of the first wall surface abuts the first inclined surface part of the first side surface whereas the remaining part of the first wall surface is in non-abutment with the remaining part of the first side surface when the first wall surface abuts the first side surface;

the second abutting part of the second wall surface abuts the second inclined surface part of the second side surface whereas the remaining part of the second wall surface is in non-abutment with the remaining part of the second side surface when the second wall surface abuts the second side surface; and a first abutting position where the first abutting part abuts the first inclined surface part is further from the bottom surface of the chip seat than a second abutting position where the second abutting part abuts the second inclined surface part.

6. The cutting edge exchange type rotating cutting tool according to claim 1, wherein:

the first wall surface is located in advance of a direction, to which a feed component of force of a cutting resistance is applied;

the second wall surface is located in advance of a direction, to which a back component of the force of the cutting resistance is applied.

7. The cutting edge exchange type rotating cutting tool according to claim 6, wherein:

a turning moment created by the feed component of force applied to the cutting insert is received by the first abutting part; and a turning moment created by a main component of force applied to the cutting insert is received by the second abutting part.

8. A cutting edge exchange type cutting tool comprising:
a tool body having a chip seat, the chip seat comprising:
a bottom surface;
first and second wall surfaces intersecting the bottom surface and arranged in directions so as to intersect each other;
a first abutting part formed in the first wall surface;
a second abutting part in the second wall surface; and
a cutting insert attached to the chip seat, the cutting insert having a plate shape and comprising:
upper and lower surfaces with polygonal external shapes;
at least first and second side surfaces extending between the upper and lower surfaces;

a cutting edge defined by intersecting parts of a cutting surface formed in the upper surface and relief surfaces formed in the plurality of side surfaces;
a first inclined surface part formed in the first side surface; and
a second inclined surface part formed in the second side surface;
wherein:
the bottom surface of the chip seat supports the lower surface of the cutting insert;
the first abutting part abuts the first inclined surface part;
the second abutting part abuts the second inclined surface part;
the first and second inclined surface parts are formed with flat surfaces;
the first inclined surface part is inclined at an obtuse angle to at least one of the bottom surface and the lower surface;
the second inclined surface part is inclined at an acute angle to at least one of the bottom surface and the lower surface;
the first side surface comprises a first recessed part which defines the first inclined surface part;
the second side surface comprises a second recessed part which defines the second inclined surface part;
the first and second recessed parts each extend along a direction between the upper and lower surfaces, and are spaced apart from the upper and lower surfaces; and
the first and second abutting parts respectively protrude from the first and second wall surfaces.

9. The cutting edge exchange type cutting tool according to claim 8, wherein shapes of the first recessed part and the second recessed part are different from each other.

10. The cutting edge exchange type cutting tool according to claim 9, wherein the first recessed part has a shape of a circular arc, in a cross-section taken perpendicular to the upper surface, and the second recessed part has a substantially V-shape, in a cross-section taken perpendicular to the upper surface.

11. The cutting edge exchange type cutting tool according to claim 8, wherein the first and second inclined surface parts are formed on both the first and second side surfaces, and the first and second recessed parts both have substantially V-shapes, each recessed part having two inclined surfaces in cross-section to define the first and second inclined surface parts.

12. A cutting edge exchange type rotating cutting tool comprising:
a tool body having a rotation axis, a rotating direction centered on the rotation axis and a chip seat, the chip seat comprising:
a bottom surface facing the rotating direction;
first and second wall surfaces intersecting the bottom surface and arranged in directions so as to intersect each other;
a first abutting part formed in the first wall surface;
a second abutting part in the second wall surface; and
a cutting insert attached to the chip seat, the cutting insert having a plate shape and comprising:
upper and lower surfaces with polygonal external shapes;
at least first and second side surfaces extending between the upper and lower surfaces;

a cutting edge defined by intersecting parts of a cutting surface formed in the upper surface and relief surfaces formed in the plurality of side surfaces;

a first inclined surface part formed in the first side surface; and a second inclined surface part formed in the second side surface;

wherein:

the bottom surface of the chip seat supports the lower surface of the cutting insert;

the first abutting part abuts the first inclined surface part;

the second abutting part abuts the second inclined surface part;

at least one of the first and second inclined surface parts is formed with a curved surface, in at least one cross-section taken perpendicular to the upper surface and the cutting edge, the cross-section passing through a first abutting position where the first inclined surface part abuts the first abutting part, an imaginary extension of the first inclined surface part is inclined at an obtuse angle to at least one of the bottom surface and the lower surface, and in at least one cross-section taken perpendicular to the upper surface and the cutting edge, the cross-section passing through a second abutting position where the second inclined surface part abuts the second abutting part, an imaginary extension of the second inclined surface part is inclined at an acute angle to at least one of the bottom surface and the lower surface.

13. The cutting edge exchange type rotating cutting tool according to claim 12, wherein:

the first abutting part of the first wall surface abuts the first inclined surface part of the first side surface whereas the remaining part of the first wall surface is in non-abutment with the remaining part of the first side surface when the first wall surface abuts the first side surface;

the second abutting part of the second wall surface abuts the second inclined surface part of the second side surface whereas the remaining part of the second wall surface is in non-abutment with the remaining part of the second side surface when the second wall surface abuts the second side surface; and the first abutting position is further from the bottom surface of the chip seat than the second abutting position.

14. The cutting edge exchange type rotating cutting tool according to claim 12, wherein:

the first wall surface is located in advance of a direction, to which a feed component of force of a cutting resistance is applied; and the second wall surface is located in advance of a direction, to which a back component of the force of the cutting resistance is applied.

15. The cutting edge exchange type rotating cutting tool according to claim 14, wherein:

a turning moment created by the feed component of force applied to the cutting insert is received by the first abutting part; and a turning moment created by a main component of force applied to the cutting insert is received by the second abutting part.

* * * * *